United States Patent [19]

Mason

[11] 3,723,796
[45] Mar. 27, 1973

[54] MULTI-ARMATURE MOTOR

[76] Inventor: Elmer B. Mason, 901 Vickie Drive, Del City, Okla. 73115

[22] Filed: Mar. 20, 1972

[21] Appl. No.: 236,114

Related U.S. Application Data

[63] Continuation-in-part of Ser. No. 35,685, May 8, 1970, Pat. No. 3,651,355.

[52] U.S. Cl. ................................ 310/126, 310/257
[51] Int. Cl. ............................................. H02k 23/00
[58] Field of Search .............. 310/112, 114, 126, 257

[56] References Cited

UNITED STATES PATENTS

| 1,874,094 | 8/1932 | Ford et al. | 310/112 X |
| 1,612,330 | 12/1926 | Trumpler | 310/112 X |
| 3,621,313 | 11/1971 | Walton | 310/112 |
| 3,549,918 | 12/1970 | Croymans et al. | 310/112 |
| 2,782,328 | 2/1957 | Lindberg | 310/126 X |

*Primary Examiner*—D. F. Duggan
*Attorney*—Robert K. Rhea

[57] ABSTRACT

A plurality of armatures are supported in parallel spaced relation in a circular array between interdigitated magnetic pole pieces energized by a central coil.

7 Claims, 7 Drawing Figures

MULTI-ARMATURE MOTOR

CROSS REFERENCE TO RELATED APPLICATION

This invention is a continuation-in-part of an application filed by me in the United States Patent Office on May 8, 1970, under Ser. No. 35,685, now U.S. Pat. No. 3,651,355 for MULTI-ARMATURE MOTORS.

BACKGROUND OF THE INVENTION

1. Field of the invention

The present invention relates to direct current motors and more particularly to a motor having a plurality of radially spaced armatures interposed between interdigitated magnetic members energized by a central coil establishing parallel magnetic circuits for exciting the armatures.

2. Description of the prior art

U.S. Pat. No. 3,471,729 discloses a plural motor assembly utilizing permanent magnets to form a magnetic field and a plurality of parallel armatures disposed within openings formed in a housing substantially enclosing the respective armatures.

This invention is distinctive over this patent by providing magnetic pole pieces partially surrounding oppositely disposed arcs of the periphery of the respective armature wherein the respective edge surface of the pole pieces are spaced-apart from each other which results in heat dissipation and cool running characteristics of the respective armature as opposed to a full enclosure of the armature wherein excessive heat buildup is generated and trapped by the armature enclosure walls.

This invention is distinctive over the above copending application by more efficient utilization of magnetic circuits energized by a common coil wherein the magnetic pole forming members are arranged in interdigitated relation adjacent the respective armature for improved torque.

SUMMARY OF THE INVENTION

A plurality of armatures are supported by end plates in parallel spaced-apart relation in a circular array around a central iron core coil. A first metallic disk member overlies one end of the coil and is provided with radially spaced finger portions projecting parallel with the coil axis and including oppositely disposed arcuate recesses respectively nesting peripheral portions of adjacent surfaces of armatures. A second similarly formed metallic disk member overlies the other end of the coil and is provided with radially spaced finger portions extending between the other disk member finger portions in interdigitated relation and including identical arcuate recesses partially surrounding the opposite circular arc surface of the respective armature and in opposition to the recesses in the first metallic member. The respective finger portions of the first metallic disk member form like magnetic poles while the respective finger portions of the second metallic disk member form opposite poles thus establishing magnetic field circuits for the respective armatures. The end plates, overlying the coil and metallic disk member ends, are provided with bearings and brush means for journalling the armatures and supplying a current thereto.

The principal object of this invention is to provide a direct current motor having a plurality of armatures utilizing a common magnetic field in a compound manner providing high starting torque and cool running characteristics.

DESCRIPTION OF THE PREFERRED EMBODIMENT

Figure 1:
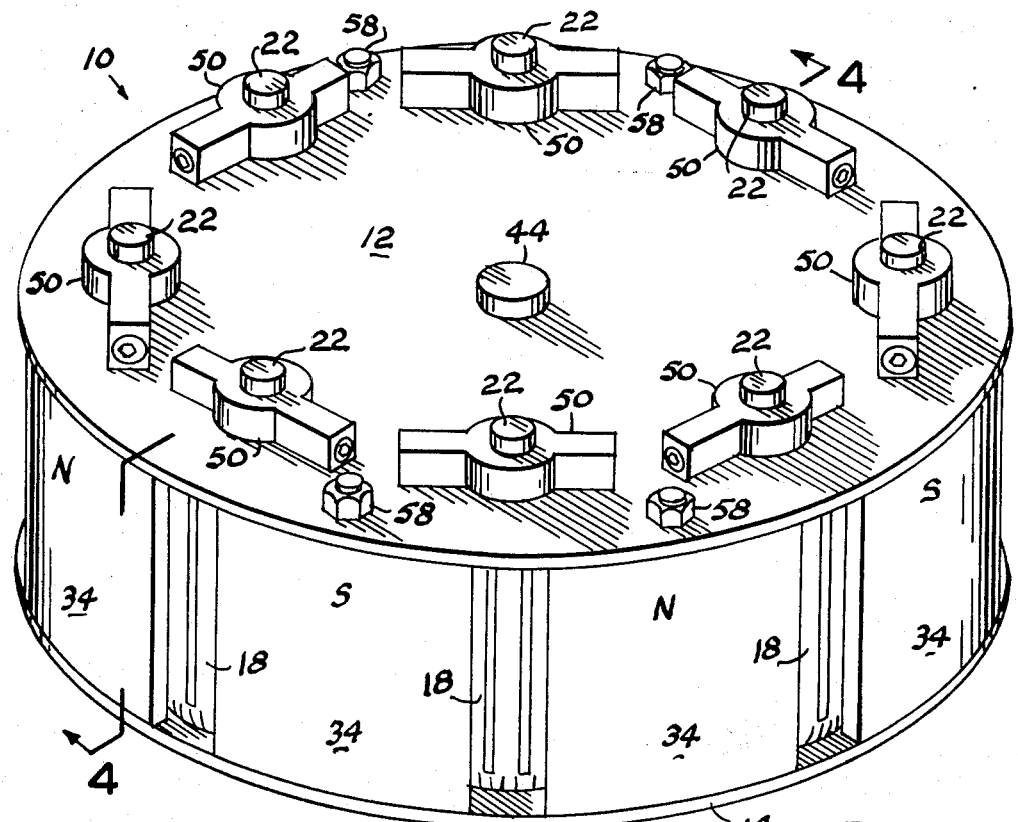
FIG. 1 is a perspective view of the motor.
Figure 2:
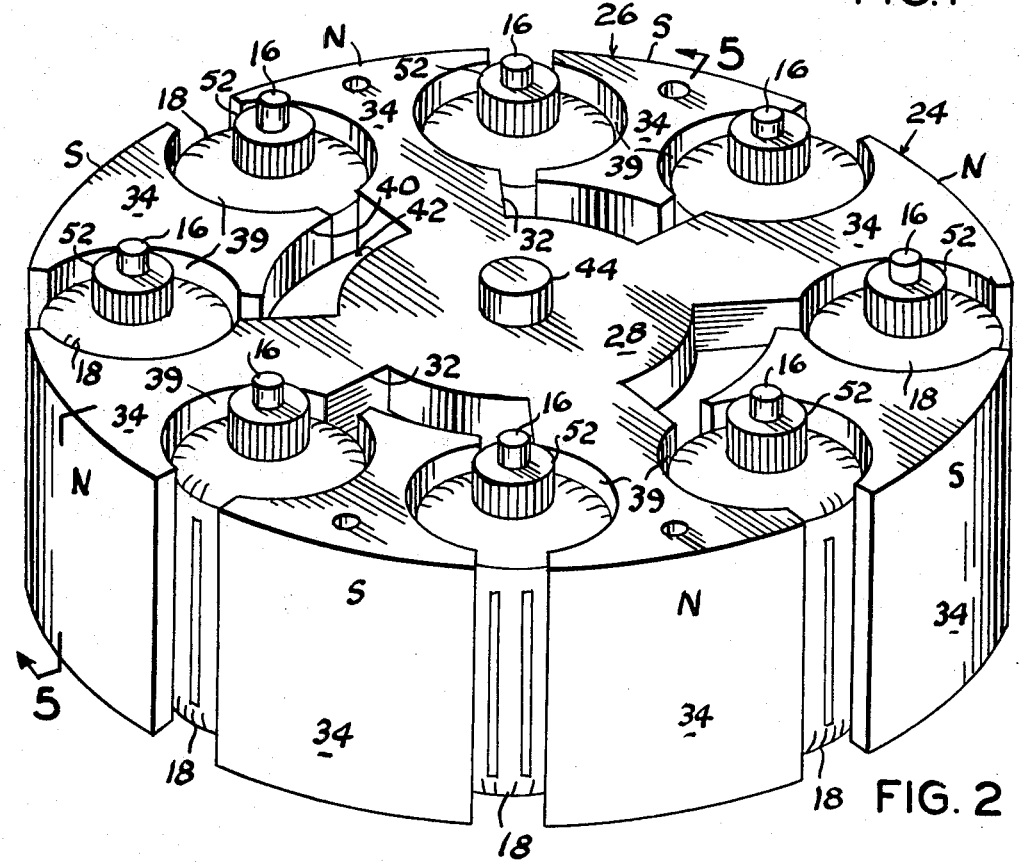
FIG. 2 is a view similar to FIG. 1 with the armature supporting end plates removed.
Figure 3:
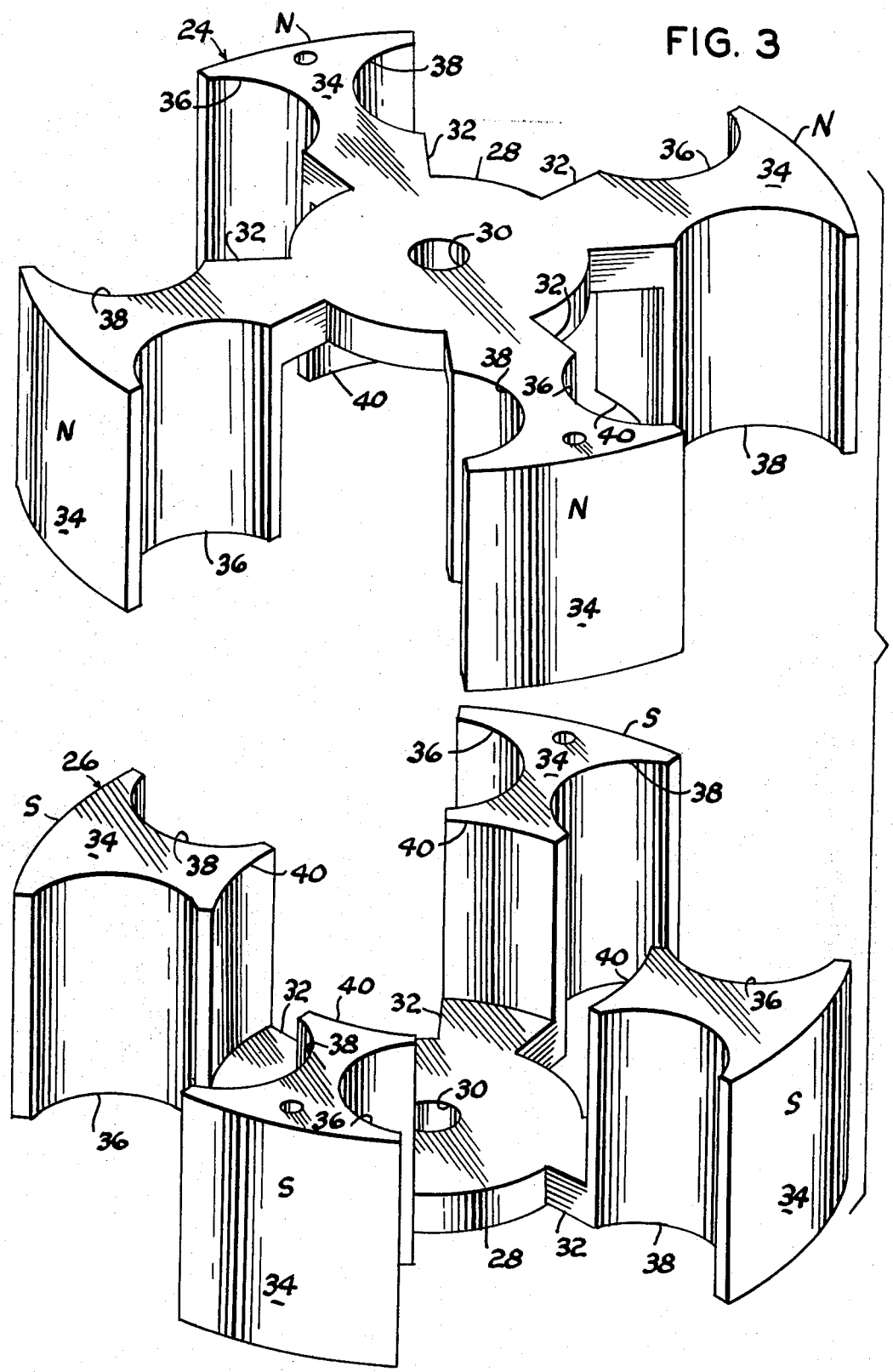
FIG. 3 is an exploded perspective view of the magnetic pole pieces with the armatures and magnetic pole forming coil removed.

Like characters of reference designate like parts in those figures of the drawings in which they occur.

In the drawings:

The reference numeral 10 indicates the motor which is cylindrical in general configuration. Obviously, the perimeter of the motor may be of any desired polygonal configuration in accordance with the desired plurality and spacing of the armatures contained thereby.

The motor 10 comprises first and second disk-like end plates 12 and 14, respectively, which journal the shaft 16 of a plurality of armatures 18 therebetween by bearings 20 and 22, respectively, which are formed on or secured to the respective outer face surface of the respective end plate. The armature shafts 16 are arranged in parallel spaced-apart relation. First and second metallic magnetic pole forming pieces 24 and 26 are interposed between the end plates 12 and 14. The metallic members 24 and 26 are substantially mirror images of each other and only the member 24 is described in detail. The member 24 includes a central disk portion 28, having a central aperture 30, and is provided with a plurality, four in the example shown, of radial arms 32 in equal spaced-apart relation. Each of the arms 32 includes an enlarged or thickened finger portion 34 projecting toward the other end plate 14 parallel with the axis of the armatures 18. The respective enlarged finger portion 34 is provided with oppositely facing coextensive arcuate recesses 36 and 38. The finger portions 34 of the first and second members 24 and 26 are arranged in interdigitated relation so that the respective recesses 36 and 38 cooperate in forming openings 39, each loosely surrounding one of the armatures 18. The outer limit or surface of the respective enlarged finger portion 34 substantially coincides with an arc of the cylindrical surface generated by the peripheries of the end plates 12 and 14. The opposite or inwardly disposed surface of the respective enlarged finger portion 34 describes a circular arc 40 formed on a diameter greater than the diameter of the disk portion 28 and on a radius less than the radial distance between the center of the disk aperture 30 and the surface of any one of the finger portion recesses surrounding the armatures 18, thus, forming a cylindrical enclosure between the disk members 28 and finger portions 34 for receiving a coil 42 having stub axle portions 44 cooperatively received by the metallic disk openings 30. The coil 42 is provided with an enlarged soft iron core 46 surrounded by windings of electrical conducting wire 48 so that the coil 42 substantially fills the cylindrical enclosure.

Figure 4:
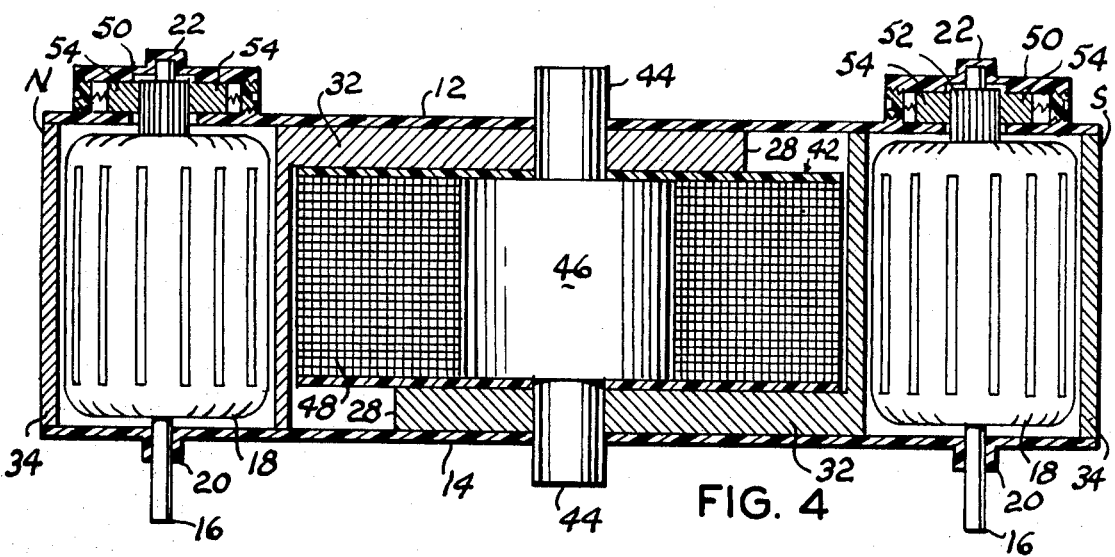
FIG. 4 is a vertical cross-sectional view taken substantially along the line 4—4 of FIG. 1.
Figure 5:
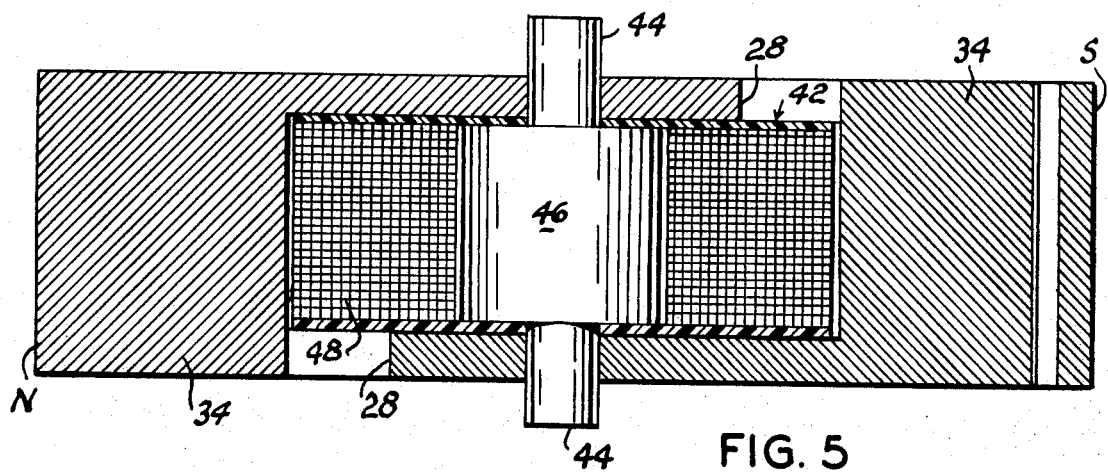
FIG. 5 is a vertical cross-sectional view taken substantially along the line 5—5 of FIG. 2.
Figure 6:
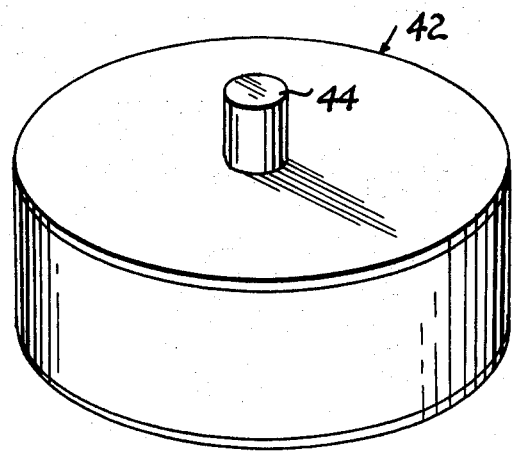
FIG. 6 is a perspective view of the coil, per se.
Figure 7:
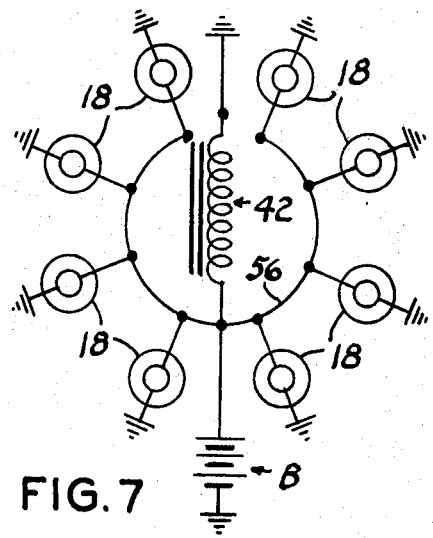
FIG. 7 is a wiring diagram.

As shown in FIGS. 1 and 4, the bearings 22 form part of a housing 50 surrounding the respective armature commutator 52 and supports brushes 54. One end of the coil wire 48 is connected to a source of energy, such as a battery B, and the other end is connected to a common ground. Similarly, one of the brushes 54 is connected to the battery B by a wire 56 and the other brush is connected to ground. When the coil 42 is energized, the members 24 and 26 form opposite pole pieces, for example, the member 24 and its respective enlarged finger portions 34 form a north pole N while the respective enlarged finger portions 34 of the member 26 form an opposite or south pole S, thus, providing a magnetic field surrounding the respective armature opening 39. The wrap-around configuration of the respective armature receiving recesses 36 and 38 provide high starting torque for the respective armature. The interdigitated finger portions 34 substantially form a wrap-around action of the coil periphery from its respective magnetic ends and forms a flow path for the magnetic flux of the coil, thus, more efficiently utilizing the magnetic properties of the coil resulting in cool running characteristics for the motor. Obviously, one or more of the armatures may remain idle without effecting the operation of the other armatures. Further, it is not essential that the stub shafts 44 be formed on the coil and in lieu thereof the disk members 28 may be joined to respective ends of the coil 42 as by a bolt or screw, not shown. The end plates 12 and 14 maintain the components in assembled relation by interconnecting bolts 58 extending through suitable apertures formed in and through selected finger portions 34. The end plates 12 and 14 may be foraminated, if desired, for heat dissipation.

Obviously the invention is susceptible to changes or alterations without defeating its practicability, therefore, I do not wish to be confined to the preferred embodiment shown in the drawings and described herein.

I claim:

1. A multiple motor assembly, comprising:
   first and second disks arranged in coaxial spaced parallel relation and each having a plurality of radially spaced enlarged finger portions connected with its periphery and projecting laterally of one flat surface of the respective said disk,
   the finger portions of said first disk being arranged in interdigitated relation with the finger portions of said second disk,
   each said finger portion having oppositely disposed coextensive arcuate recesses formed therein extending parallel with the axis of said disks and in opposed confronting relation with like arcuate recesses formed in adjacent finger portions defining armature receiving openings between adjacent finger portions;
   an armature within each armature receiving opening;
   a plate overlying each said disk;
   magnetic field generating means between said disks; and,
   means connecting said field generating means with said first and said second disks to generate a magnetic field at each of said armature receiving openings.

2. The multiple motor assembly according to claim 1 in which each arcuate recess in said finger portions extend through an arc less than 180°.

3. The multiple motor assembly according to claim 2 in which said magnetic field generating means includes:
   an iron core extending coaxially between said disks; and,
   a wire wound around said core forming a coil surrounded by said interdigitated finger portions.

4. The multiple motor assembly according to claim 3 in which said connecting means includes:
   a shaft connecting the iron core with the respective said disk; and,
   a source of electrical energy connected with said coil whereby the finger portions on one said disk form north magnetic pole pieces and the finger portions on the other said disk form south magnetic pole pieces.

5. The multiple motor assembly according to claim 4 and further including:
   a like plurality of radial arms extending between and connecting the respective finger portion with the respective said disk.

6. The multiple motor assembly according to claim 5 in which
   said finger portions are coextensive with each other when disposed in interdigitated relation.

7. The multiple motor assembly according to claim 6 in which
   each said armature is provided with an armature shaft projecting through the respective said plate; and,
   bearings on the respective said plate journalling said armature shafts.

* * * * *